(12) United States Patent
Ohtsuji (10) Patent No.: US 7,146,941 B2
(45) Date of Patent: Dec. 12, 2006

(54) ROTARY VALVE

(75) Inventor: Takamasa Ohtsuji, Saitama (JP)

(73) Assignee: Komatsu Zenoah Co., Saitama (JP)

( * ) Notice: Subject to any disclaimer, the term of this patent is extended or adjusted under 35 U.S.C. 154(b) by 0 days.

(21) Appl. No.: 11/020,389

(22) Filed: Dec. 22, 2004

(65) Prior Publication Data

US 2006/0130783 A1    Jun. 22, 2006

(51) Int. Cl.
*F02B 75/02* (2006.01)

(52) U.S. Cl. .................. 123/65 V; 251/314

(58) Field of Classification Search ............. 123/65 V; 251/314, 316, 317
See application file for complete search history.

(56) References Cited

U.S. PATENT DOCUMENTS

| 5,081,972 | A | * | 1/1992 | Daly et al. ............... 123/337 |
| 6,328,288 | B1 | | 12/2001 | Gerhardy |
| 6,497,204 | B1 | | 12/2002 | Miyazaki et al. |

FOREIGN PATENT DOCUMENTS

| DE | 19924397 A1 | 11/2000 |
| DE | 20119880 U1 | 4/2002 |
| DE | 10218176 A1 | 11/2003 |
| EP | 1281839 A2 | 2/2003 |
| JP | 09-268918 | 10/1997 |
| JP | 09-273405 | 10/1997 |
| JP | 2000-328945 | 11/2000 |
| JP | 2002-130063 | 5/2002 |
| JP | 2002-130064 | 5/2002 |

\* cited by examiner

*Primary Examiner*—Tony M. Argenbright
*Assistant Examiner*—Katrina Harris
(74) *Attorney, Agent, or Firm*—Everest Intellectual Property Law Group; Michael S. Leonard (57) ABSTRACT

A rotary valve which can securely shut off a fluid flow without improving a working accuracy of an outer peripheral surface of a valve and an inner diameter portion of a body, and which has a simple and compact structure, wherein a gap is formed between the outer peripheral surface of the valve and the inner diameter portion of the body, a lip portion of seal means attached within a second lead air flow path is brought into contact with the outer peripheral surface of the valve on the basis of an elastic force of a support portion, and the lip portion securely seals between the second lead air flow path and the gap.

14 Claims, 8 Drawing Sheets

ROTARY VALVE

BACKGROUND OF THE INVENTION

1. Field of the Invention

The present invention relates to a rotary valve which is disposed between fluid flow paths, and can execute a flow rate adjustment and a flow rate shutoff of a fluid flowing within the fluid flow paths, and more particularly related to a rotary valve which can be used as a lead air control valve of a stratified scavenging two-cycle engine.

2. Description of the Related Art

Conventionally, as a valve body which is disposed between fluid flow paths, and can execute a flow rate adjustment and a flow rate shutoff of a fluid flowing within the fluid flow paths, there has been known a butterfly type throttle valve and a rotary valve. In particular, a lead air control apparatus (for example, refer to Japanese Patent Application Laid-Open (JP-A) No. 2000-328945) employing a butterfly type throttle valve as a lead air control valve of a stratified scavenging two-cycle engine or a carburetor for a two-cycle engine (for example, refer to JP-A No. 9-268918) employing a rotary type throttle valve are proposed by the applicant of the present invention, respectively.

Figure 7:
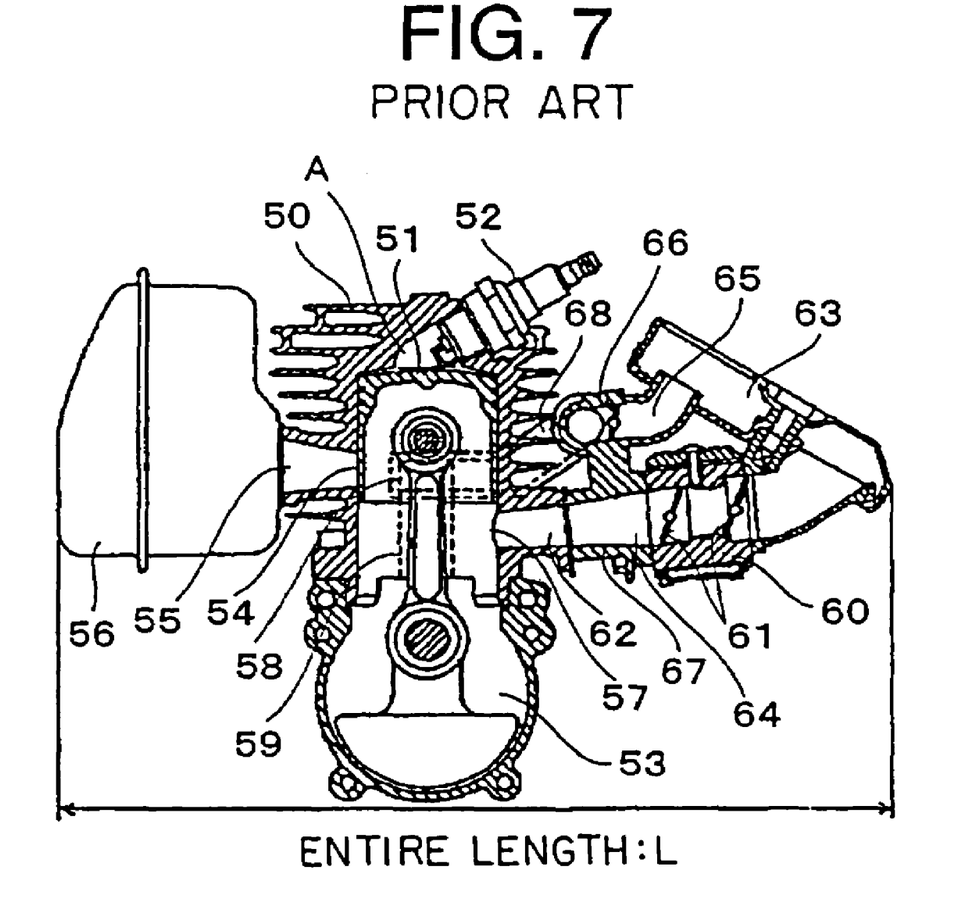
FIG. 7 is a schematic front cross sectional view showing an entire view of a conventional art.

The lead air control apparatus described in JP-A No. 2000-328945 is provided with a configuration shown in FIG. 7. In other words, a carburetor 60 having a throttle valve 61 is attached, via an insulator 67, to a first intake passage 62 connected to an intake port 57 open to a cylinder 50, and an intake side of the carburetor 60 is connected to an air cleaner 63. Within the insulator 67, there are provided a second intake passage 64 connected to the first intake passage 62, and a lead air passage 65 which is parallel to the second intake passage 64. One end of the lead air passage 65 is connected to the air cleaner 63, and the other end is connected to a scavenging port 58 open to the cylinder 50 via a connection pipe 68. A butterfly type air control valve 66 for controlling an air flow rate is provided within the lead air passage 65, and works with a throttle valve 61 provided in the second intake passage 64.

As shown in FIG. 7, an air-fuel mixture is compressed in a cylinder chamber A at a top dead center position of a piston 51. In this state, when the air-fuel mixture is ignited by a spark plug 52, the air-fuel mixture is exploded, and pushes down the piston 51. At this time point, the scavenging port 58 and a scavenging passage 59 are filled with a lead air purified by the air cleaner 63, and a crank chamber 53 is filled with the air-fuel mixture, in which a fuel and air purified by the air cleaner 63 are mixed, by the carburetor 60.

When the piston 51 moves downward, the intake port 57 is first closed, and the air-fuel mixture filled in the crank chamber 53 is compressed. Next, an exhaust port 54 is opened in accordance with the downward movement of the piston 51, and a combustion gas is discharged to an external portion through an exhaust passage 55 via a muffler 56. Subsequently, the scavenging port 58 is opened, and the lead air filled in the scavenging port 58 and the scavenging passage 59 flows into the cylinder chamber A on the basis of a pressure of the compressed air-fuel mixture within the crank chamber 53, and the remaining combustion gas is discharged from the exhaust port 54.

Thereafter, the air-fuel mixture within the crank chamber 53 flows into the cylinder chamber A. However, since the piston 51 moves upward and the exhaust port 54 is closed at this time, the air-fuel mixture is prevented from being discharged to the external portion, an amount of hydrocarbon HC contained in the exhaust gas is reduced, and it is possible to reduce a loss of the fuel.

The amount of the air-fuel mixture passing through the carburetor 60 can be controlled by the throttle valve 61, and the amount of the lead air passing through the air passage 65 can be controlled by the air control valve 66. Since the throttle valve 61 and the air control valve 66 work with each other, it is possible to always keep a balance of the amount of the air-fuel mixture and the amount of the lead air, and it is possible to execute a combustion control under an optimum state.

Figure 1:
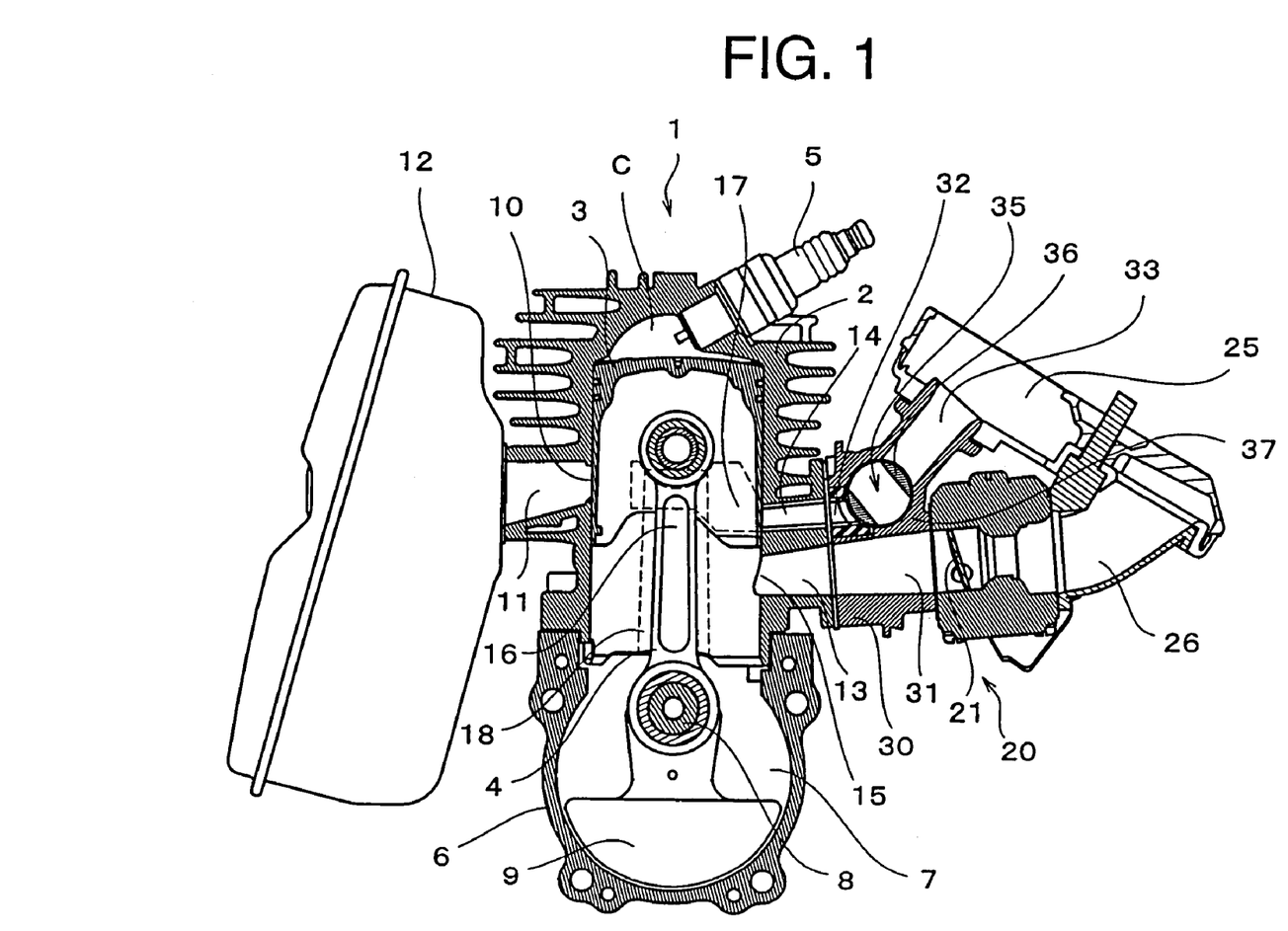
FIG. 1 is a schematic front cross sectional view showing an entire view of the present invention (embodiment).

Accordingly, in the invention described in JP-A No. 2000-328945, since the air control valve 66 is provided within the air passage 65 for the lead air within the insulator 67, there can be obtained such effects that the air control valve 66 can be provided within a limited space without requiring an area product, it is possible to make an entire length L of a whole of the engine shown in FIG. 1 short, and it is possible to obtain a light and compact stratified scavenging two-cycle engine.

Further, since the air control valve corresponding to a constituting part which has been conventionally provided between the air cleaner and the carburetor is not required, it is possible to reduce the number of the parts, and since the carburetor can employ a general carburetor, there can be obtained an effect that a cost thereof can be reduced.

Figure 8:
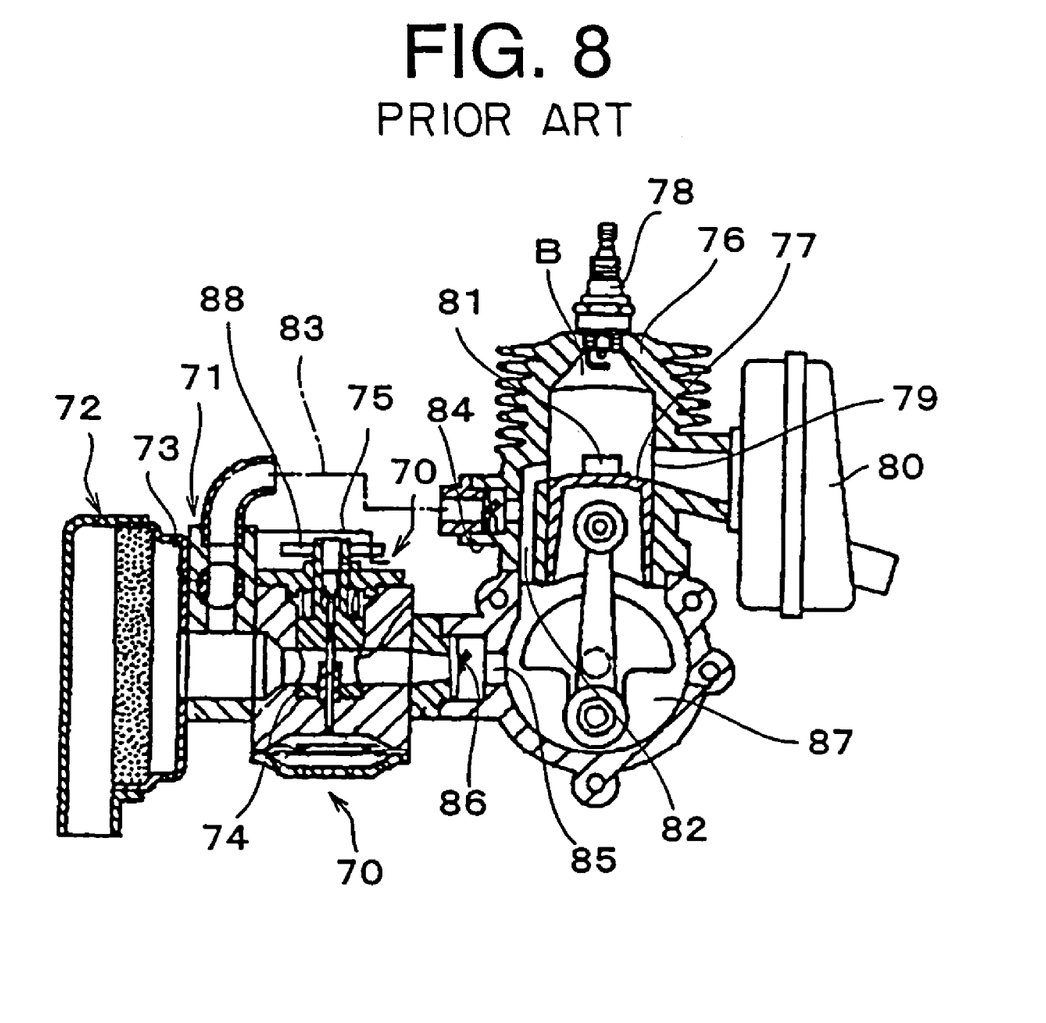
FIG. 8 is a schematic front cross sectional view showing an entire view of another conventional art.

Next, the carburetor for the two-cycle engine described in JP-A No. 9-268918 is provided with a configuration shown in FIG. 8. In other words, an air passage 83 is connected to a portion in a scavenging passage 82 connecting a scavenging port 81 and a crank chamber 87 of a two-cycle engine, the portion close to the scavenging port 81. A check valve 84 allowing an air flow toward the scavenging passage 82 is provided in the air passage 83.

An air control valve 71 is provided for controlling an amount of air supplied to the air passage 83 from an air cleaner 72, and a rotary type throttle valve 73 is provided as the air control valve 71. Further, the configuration is made such that an air-fuel mixture is supplied to the crank chamber 87 from the air cleaner 72 via a carburetor 70 and a check valve 86. In order to open and close the throttle valve 73 of the air control valve 71 so as to work with an opening and closing motion of the throttle valve 74 in the carburetor 70, an operating lever 88 for driving the throttle valve 74 and a lever (not shown) for actuating the throttle valve 73 are connected to each other by a connection rod 75 so as to freely adjust a mutual interval between the both.

The carburetor for the two-cycle engine described in JP-A No. 9-268918 takes on the same actuation as that of the lead air control apparatus described in JP-A No. 2000-328945. When the air-fuel mixture compressed in an upper portion of a piston 77 is ignited by a spark plug 78, the piston 77 descends by an explosion energy of the air-fuel mixture. The combustion gas is discharged to the external portion from a discharge port 79 via an exhaust muffler on the basis of the descending motion of the piston 77, the scavenging port 81 is subsequently opened, and the lead air filled in the scavenging port 81 and the scavenging passage 82 flows into a cylinder chamber B on the basis of the pressure of the compressed air-fuel mixture within the crank chamber 87 and the remaining combustion gas is discharged from the exhaust port 79.

Next, the air-fuel mixture in the crank chamber 87 flows into the cylinder chamber B via the scavenging passage 82 and the scavenging port 81. The lead air inflows first in a state in which the air flowing into the cylinder chamber B from the scavenging port 81 and the air-fuel mixture flowing into the cylinder chamber B from the crank chamber 87 via the scavenging passage 82 and the scavenging port 81 are not mixed but separated, and the air-fuel mixture next flows in.

Next, when the piston 77 moves into an ascending stroke from the bottom dead center and reaches a position near the top dead center, the crank chamber 87 becomes in a negative pressure state, the check valve 86 of an intake port 85 is opened, and the air-fuel mixture generated in the carburetor 70 is sucked into the crank chamber 87 from the intake port 85.

Further, the check valve 84 is opened on the basis of the negative pressure of the crank chamber 87, and the air is sucked into the crank chamber 87 from the air cleaner 72 via the air control valve 71, the air passage 83, the check valve 84 and the scavenging passage 82. When the piston 77 reaches approximately the top dead center in the manner mentioned above, there is achieved a state in which the crank chamber 87 is filled with the air-fuel mixture, and the scavenging passage 82 and the scavenging port 81 are filled only with the air.

In the invention described in JP-A No. 9-268918, it is possible to lock an end portion of the connection rod 75 for driving the throttle valve 74 of the carburetor 70 and the throttle valve 73 of the air control valve 71 in an interlocking manner, by selecting an adjusting hole of an operating lever 88 or an adjusting hole of the lever (not shown) of the air control valve 71. Accordingly, it is possible to obtain an optimum opening degree of the throttle valve 73 in the air control valve 71 with respect to an opening degree of the throttle valve 74.

Accordingly, since it is possible to flow out only the air first flowing into the cylinder chamber B at the scavenging stroke to the exhaust port 79 together with the combustion gas, and hold the air-fuel mixture flowing into the cylinder chamber B after the lead air in the cylinder chamber B, a scavenging efficiency can be made high. As a result, it is possible to reduce an amount of an unburned component (HC) contained in the exhaust gas, thereby effectively using the fuel with no loss. Therefore, there can be achieved an effect that an output of the two-cycle engine cab be increased.

In the invention described in JP-A No. 2000-328945, since the lead air control apparatus employs the butterfly type throttle valve and the throttle valve shaft, it is necessary to use and assemble screws or the like for connecting the throttle valve and the throttle valve shaft. Accordingly, if a length of the air passage in the intake side or the cylinder side from an installing position of the valve is long, it is hard to insert a tool and an assembling work or the like is hard to be executed. Therefore, the valve arranged position is limited to a position in which the assembling work can be executed by the tool. Further, it is necessary to bear the throttle valve shaft at both ends thereof, an accuracy of working positions of both holes for bearing the throttle valve shaft is required.

Although, in the invention described in JP-A No. 9-268918, the rotary type throttle valve 5 is employed in the air control valve C, in order to keep a sealing performance in the rotary type throttle valve 5, it is required to configure an interval between an outer peripheral surface of the valve and an inner diameter surface of the body minimum. In order to form a minimum fixed interval, it is necessary to form the outer peripheral surface of the valve and the inner diameter surface of the body in accordance with an accurate working.

SUMMARY OF THE INVENTION

An object of the present invention is to provide a rotary valve in which it is possible to employ a rotary valve configured such that a gap is intentionally provided between an outer peripheral surface of a valve and an inner diameter portion of a body without making the interval therebetween minimum, and a sealing performance with respect to the gap is provided.

The object of the present invention can be achieved by each of inventions described in first to seventh aspects.

In other words, in accordance with a most main feature of the present invention, as described in a first aspect of the invention, there is provided a rotary valve disposed between fluid flow paths and having a valve and a body, comprising: a gap formed between an inner diameter portion of the body and an outer peripheral surface of the valve; and seal means disposed between the inner diameter portion of the body and the outer peripheral surface of the valve, wherein the seal means seals between at least one fluid flow path and the gap.

Further, in accordance with a main feature of the present invention, as described in a second aspect of the invention, the seal means has a lip portion and a support portion of the lip portion elastically supports the lip portion.

Further, in accordance with a main feature of the present invention, as described in a third aspect of the invention, the lip portion is brought into contact with the outer peripheral surface of the valve.

Further, in accordance with a main feature of the present invention, as described in a fourth aspect of the invention, the lip portion is brought into contact with the inner diameter portion of the body.

Further, in accordance with a main feature of the present invention, as described in a fifth aspect of the invention, a side of a surface of the lip portion, the surface not establishing contact with the inner diameter portion of the body or the outer peripheral surface of the valve, is directed to a high pressure fluid side of the fluid flow path.

Further, in accordance with a main feature of the present invention, as described in a sixth aspect of the invention, the rotary valve described in any one of the first to fifth aspects mentioned above is formed as a lead air control valve of a stratified scavenging two-cycle engine.

Further, in accordance with a main feature of the present invention, as described in a seventh aspect of the invention, the rotary valve is provided in an insulator connected to an intake port of the stratified scavenging two-cycle engine.

In accordance with the present invention, in the rotary valve in which the gap is formed between the inner diameter portion of the body and the outer peripheral surface of the valve, it is the characteristic feature that the seal means for sealing between at least one fluid flow path connected to the rotary valve and the gap is disposed between the inner diameter portion of the body and the outer peripheral surface of the valve.

Accordingly, it is possible to employ the rotary valve in which the gap between the outer peripheral surface of the valve and the inner diameter portion of the body is intentionally expanded to such an interval magnitude as to prevent a heat deformation, a deformation due to an assembly, and malfunction due to a pinching of dust or the like. Moreover, it is possible to securely seal between the gap between the outer peripheral surface of the valve and the inner diameter portion of the body, and the fluid flow path in which the rotary valve is disposed, by the seal means arranged between the inner diameter portion of the body and the outer peripheral surface of the valve.

Accordingly, it is possible to easily employ the rotary valve capable of reducing the cost as the throttle valve without necessity of the special working and assembly which are required in the butterfly type throttle valve and the conventional rotary valve. Moreover, since the rotary valve can be easily manufactured without requiring a high working accuracy for working upon the outer peripheral surface of the valve and the inner diameter surface of the body, it is possible to lower a manufacturing cost of the rotary valve. In addition, it is possible to prevent the heat deformation, the deformation due to the assembly, and the malfunction due to the pinching of the dust or the like, by the gap between the outer peripheral surface of the valve and the inner diameter portion of the body.

Further, it is not necessary to configure the throttle valve and the throttle valve shaft by the separate bodies as is different from the butterfly type throttle valve, and a plurality of valve through holes can be controlled by one component by forming a plurality of valve through holes in the valve of the rotary valve. Further, a large amount of flow rate can be controlled by one rotary valve in accordance with the number of the valve through holes, and it is possible to provide the rotary valve having a simple and compact structure.

With respect to the seal means, it is possible to absorb dispersion in the individual parts and improve the sealing performance, by forming the shape of the contact portion of the seal in a lip shape, and applying an elasticity to the support portion of the lip portion formed in the lip shape. In the case that the contact surface of the lip portion is brought into contact with the outer peripheral surface of the valve or the inner diameter portion of the body, it is possible to seal between at least one fluid flow path connected to the rotary valve and the gap, by the seal means arranged between the inner diameter portion of the body and the outer peripheral surface of the valve.

Further, the configuration may be made such that elastic energizing means serving as the support portion is provided in one end portion of a seal main body in the seal means, and the lip portion in the other end portion of the seal main body is brought into contact with the outer peripheral surface of the valve or the inner diameter portion of the body. In accordance with the configuration, the sealing performance with respect to the outer peripheral surface of the valve or the inner diameter portion of the body can be improved by using an energizing force of the elastic energizing means.

Seal means on the basis of a line contact is formed by constituting the contact surface brought into contact with the outer peripheral surface of the valve or the inner diameter portion of the body in the lip portion by a corner portion of the lip portion, whereby it is possible to lower a working resistance of the valve.

By disposing a non-contact surface side of the lip portion with respect to the inner diameter portion of the body or the outer peripheral surface of the valve so as to be directed to the high pressure fluid side of a fluid flow path, the contact portion of the lip portion is pressed in a contact direction of the outer peripheral surface of the valve or the inner diameter portion of the body by a high pressure side fluid, so that the sealing performance of the seal means can be improved. Further, when a low pressure fluid side of the fluid flow path connected to the rotary valve comes to a negative pressure, the contact portion of the lip portion is sucked to the side of the outer peripheral surface of the valve or the inner diameter portion of the body, whereby it is possible to improve the sealing performance of the seal means.

When the rotary valve according to the invention is used as the lead air control valve of the stratified scavenging two-cycle engine, the rotary valve can be used as the throttle valve having a low cost. Moreover, it is possible to securely shut off the communication of the lead air so as to prevent the lead air from leaking into the cylinder of the stratified scavenging two-cycle engine at a starting time or an idling time. This makes it possible to prevent the lead air from being introduced into the cylinder of the stratified scavenging two-cycle engine at the starting time or the idling time, and to prevent the engine start from being hard and prevent an idling engine speed from being hard to be adjusted, due to the introduction of the lead air at the starting time.

Further, when the rotary valve according to the invention is provided as the lead air control valve of the stratified scavenging two-cycle engine in the insulator connected to the intake port of the stratified scavenging two-cycle engine, the rotary valve can be freely arranged in the air passage, and the area product can be made small.

DESCRIPTION OF THE PREFERRED EMBODIMENTS

A preferable embodiment of the present invention will be specifically explained below, with reference to the accompanying drawings. With respect to a rotary valve according to the invention, the following description is given by using an example in which the rotary valve is provided in a flow path of a lead air in a stratified scavenging two-cycle engine. However, the rotary valve of the invention is not limited to being provided in the flow path of the lead air in the stratified scavenging two-cycle engine, but can be used as a fluid control valve arranged between the fluid flow paths.

Furthermore, with respect to a fluid which can be controlled by the rotary valve of the invention, the rotary valve can control a flow rate of a liquid and a gas in addition to the air. Accordingly, the present invention is not limited to the embodiments described below, but can be variously modified.

Figure 2:
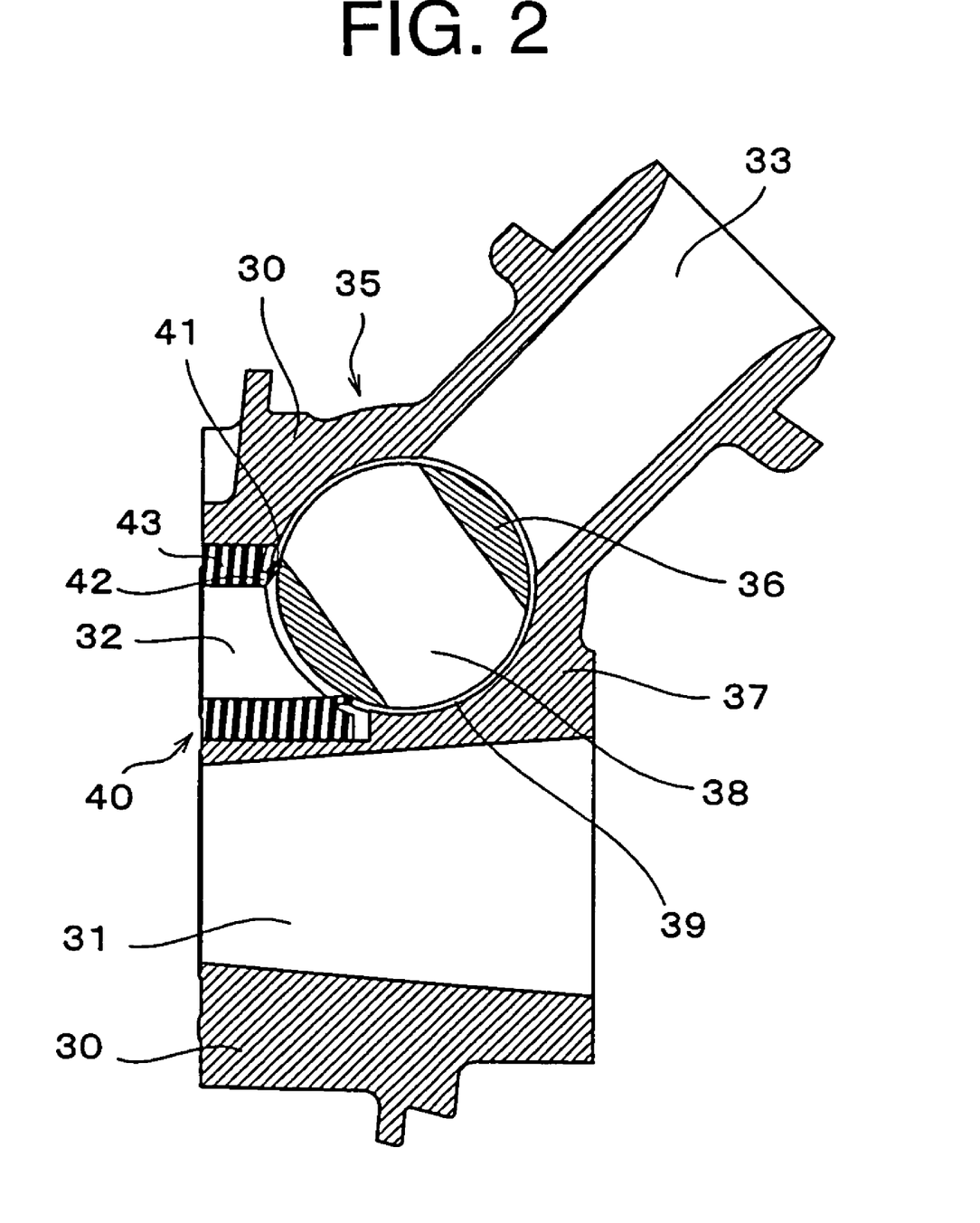
FIG. 2 is a schematic cross sectional view showing a closed state of a rotary valve (first embodiment).
Figure 3:
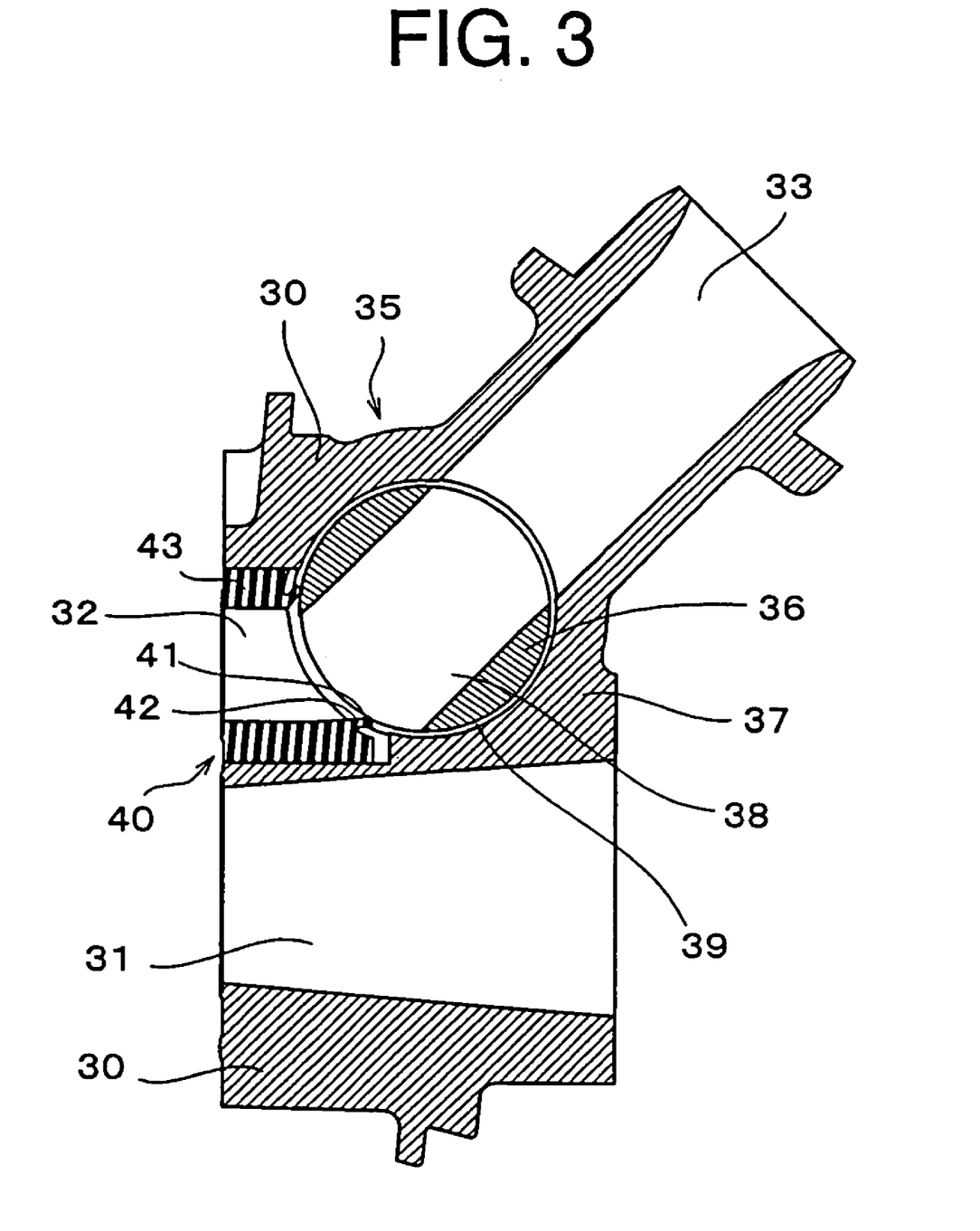
FIG. 3 is a schematic cross sectional view showing an open and closed state of the rotary valve (first embodiment).

FIG. 1 is a front cross sectional view of a stratified scavenging two-cycle engine having a rotary valve 35 serving as a switch valve of a lead air according to an embodiment of the present invention. FIGS. 2 to 6 show partial enlarging views in a disposed position of the rotary valve according to the invention. FIGS. 2 and 3 show a working condition of a rotary valve according to a first embodiment of the present invention, in which FIG. 2 shows a state in which the rotary valve is closed, and FIG. 3 shows a state in which the rotary valve is opened.

Figure 4:
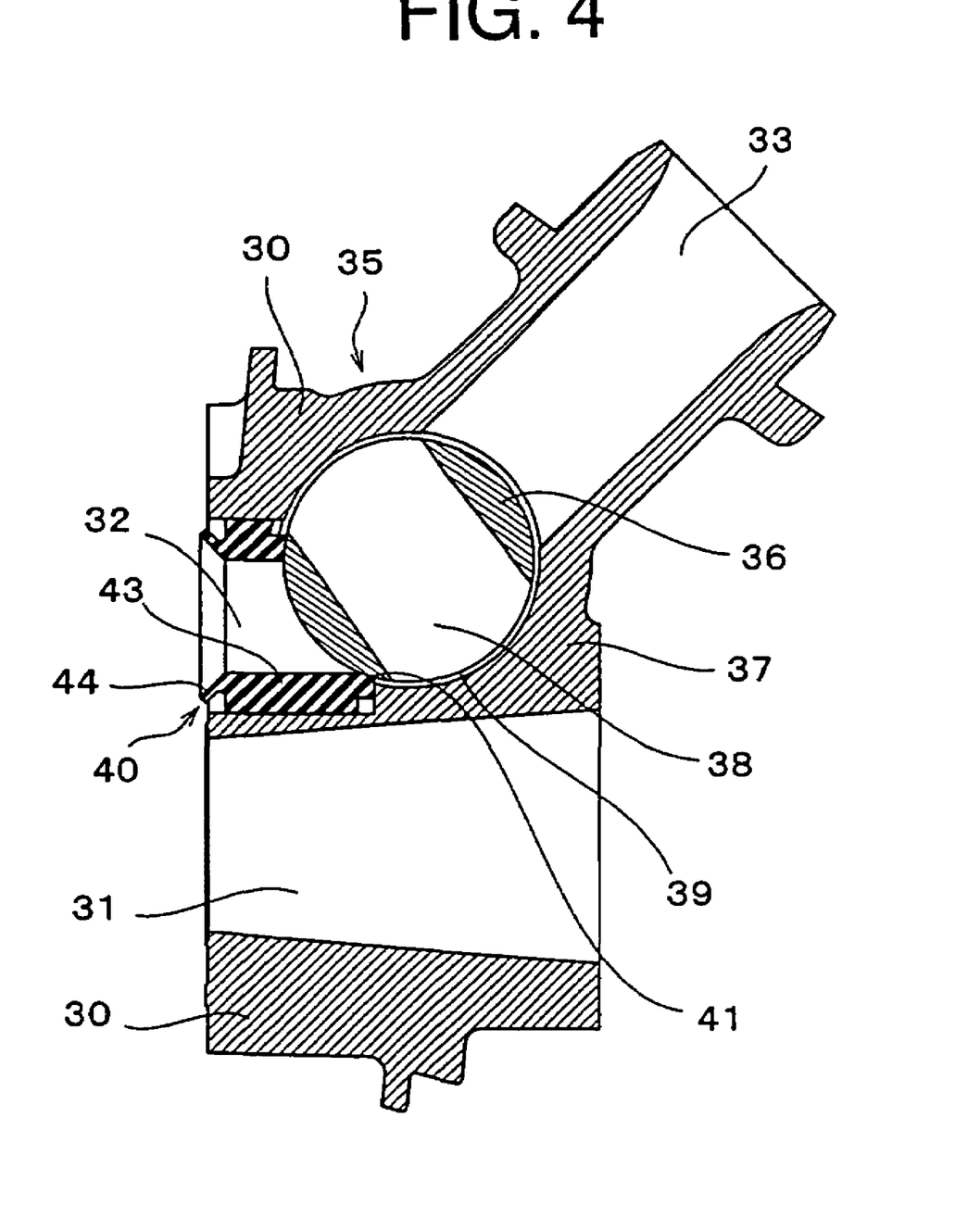
FIG. 4 is a schematic cross sectional view showing a closed state of a rotary valve (second embodiment).
Figure 5:
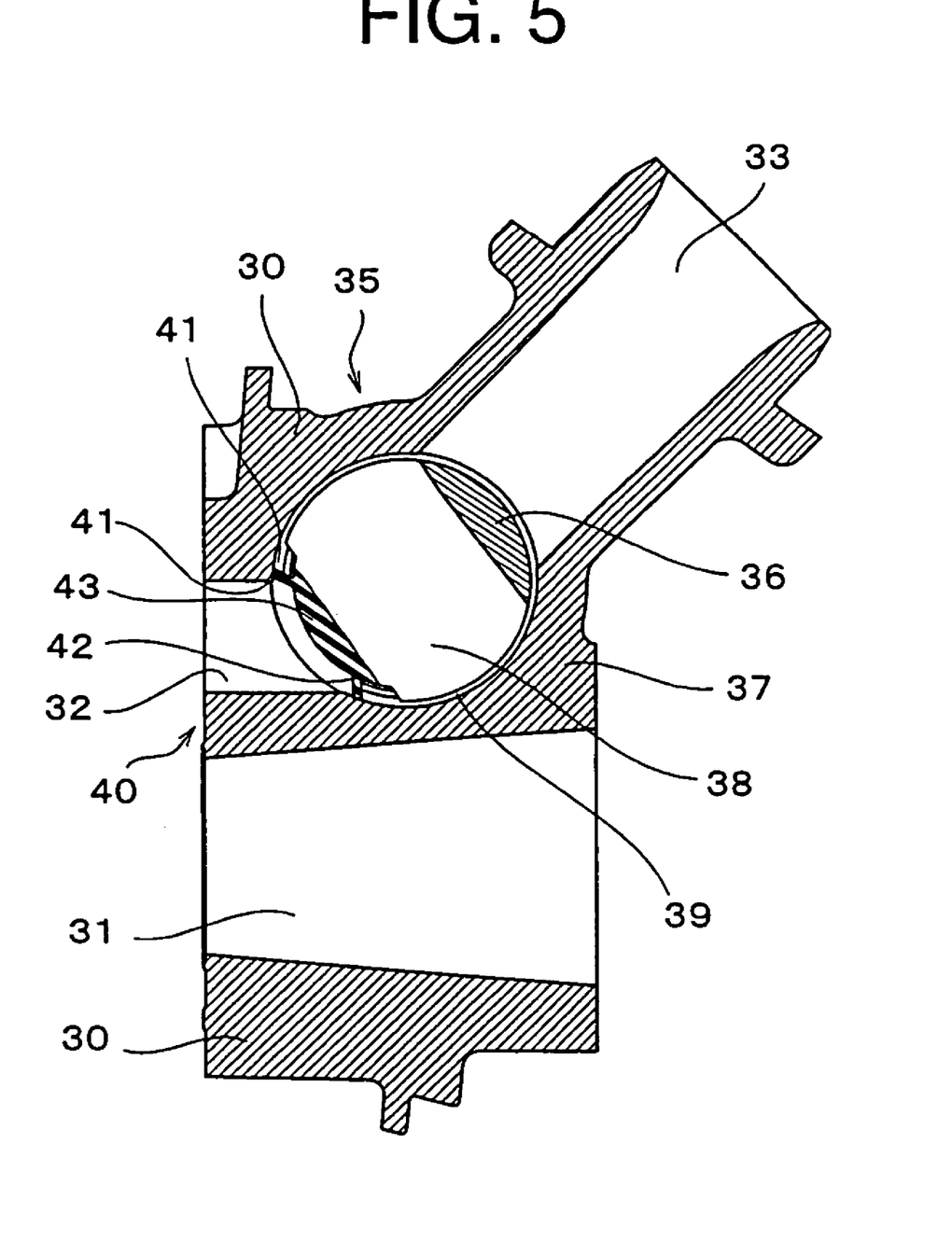
FIG. 5 is a schematic cross sectional view showing a closed state of a rotary valve (third embodiment).
Figure 6:
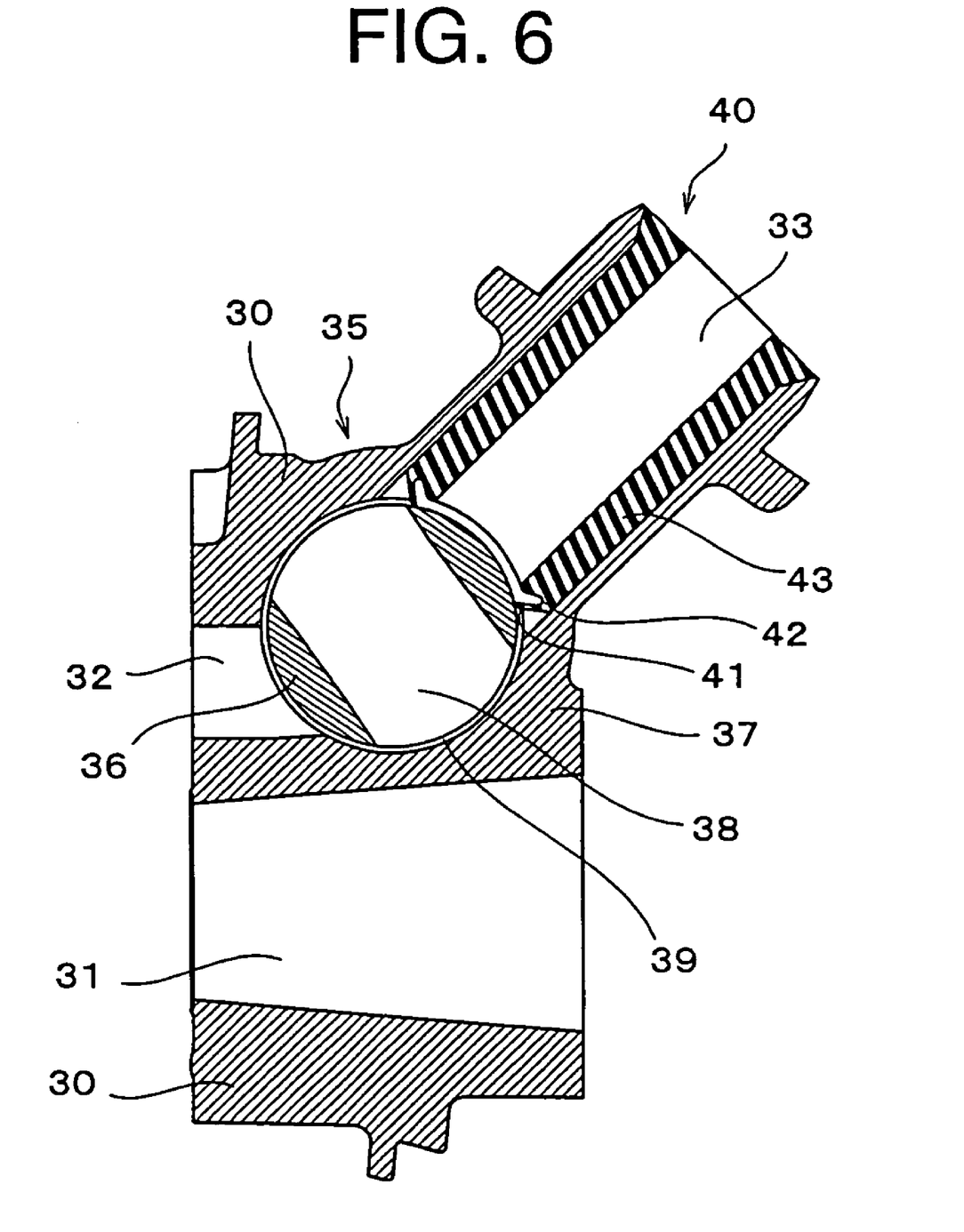
FIG. 6 is a schematic cross sectional view showing a closed state of a rotary valve (fourth embodiment).

FIG. 4 shows a state in which a rotary valve according to a second embodiment of the present invention is closed, and FIG. 5 shows a state in which a rotary valve according to a third embodiment of the present invention is closed. Further, FIG. 6 shows a state in which a rotary valve according to a fourth embodiment of the present invention is closed.

(First Embodiment)

As shown in FIG. 1, as a stratified scavenging two-cycle engine 1, a piston 3 is slidably fitted to a cylinder 2 attached to an upper portion of a crank case 6. One end of a crank.9 rotatably supported within a crank chamber 7 is connected to a crank shaft 8 rotatably attached to the crank case 6, and the piston 3 is connected to the crank shaft 8 via a connecting rod 4. Further, a spark plug 5 is attached to a top portion of the cylinder 2.

An exhaust port 10 open to an inner wall surface of the cylinder 2 is connected to a muffler 12 via an exhaust flow path 11. A scavenging port 16 is open to a slightly lower side of the exhaust pot 10 in the inner wall surface of the cylinder 2. The scavenging port 16 is communicated with the crank chamber 7 by a scavenging flow path 18. The scavenging port 16 is also communicated with a first lead air flow path 14 communicated with a rotary valve 35 via a piston groove 17 provided in an outer peripheral portion of the piston 3.

An intake port 15 open to the crank chamber 7 is formed in a lower portion of the inner wall surface of the cylinder 2, and the intake port 15 is communicated with a second intake flow path 31 communicated with a carburetor 20 via a first intake flow path 13.

The first intake flow path 13 and the first lead air flow path 14 are respectively connected to a second intake flow path 31 and a second lead air flow path 32 formed in an insulator 30 provided for the purpose of heat insulation. Further, the rotary valve 35 is arranged in the insulator 30, and a third lead air flow path 33 connected to the rotary valve 35 is formed therein.

The second intake flow path 31 formed in the insulator 30 is connected to the carburetor 20, and the carburetor 20 is connected to a fuel tank (not shown) and an air cleaner 25. Further, the third lead air flow path 33 formed in the insulator 30 is also connected to the air cleaner 25.

A butterfly type throttle valve 21 is provided in the carburetor 20, and can control a flow rate of an air-fuel mixture. The butterfly type throttle valve 21 and the rotary valve 35 are configured such that throttle amounts thereof can be controlled in an interlocking manner by interlocking means such as a link apparatus (not shown).

Next, a description will be given of an actuation of the stratified scavenging two-cycle engine 1. At a top dead center position of the piston 3 shown in FIG. 1, when the air-fuel mixture compressed in the cylinder chamber C is ignited by the spark plug 5, the air-fuel mixture is exploded and pushes down the piston 3 downward.

At this time point, the scavenging port 16 and the scavenging flow path 18 are filled with the lead air purified by the air cleaner 25. Further, the crank chamber 7 is filled with the air-fuel mixture in which the fuel and the air purified by the air cleaner 25 are mixed in the carburetor 20.

When the piston 3 moves downward, the intake port 15 is first closed, and the air-fuel mixture within the crank chamber 7 is compressed. In accordance with the downward movement of the piston 3, the exhaust port 10 is next opened, and the combustion gas passes through the exhaust flow path 11, and is discharged to an external portion via the muffler 12. Subsequently, the scavenging port 16 is opened, and the lead air flows into the cylinder chamber C from the scavenging port 16 on the basis of a pressure of the compressed air-fuel mixture within the crank chamber 7, and the combustion gas remaining in the cylinder chamber C is discharged from the exhaust port 10.

Following to the inflow of the lead air to the cylinder chamber C, the air-fuel mixture within the crank chamber 7 flows into the cylinder chamber C. However, when the air-fuel mixture flows into the cylinder chamber C, the piston 3 is moved upward and comes to a state in which the piston 3 closes the exhaust port 10. Accordingly, the air-fuel mixture is prevented from being discharged to the external portion as it is, it is possible to reduce an amount of hydro carbon HC contained in the exhaust gas, and a loss of the fuel is reduced.

An amount of the air-fuel mixture passing through the carburetor 20 is controlled by the throttle valve 21, and an amount of the lead air is controlled by the rotary valve 35. The throttle amounts of the throttle valve 21 and the rotary valve 35 are controlled in an interlocking manner, whereby it is possible to always keep a balance of the amount of the air-fuel mixture and the amount of the lead air, and it is possible to execute a combustion in an optimum state.

As shown in FIG. 2, the rotary valve 35 has a valve 36, a body 37 and seal means 40. A valve through hole 38 is formed in the valve 36, and a plurality of valve through holes 38 are formed at a predetermined interval in an axial direction of the valve 36 as occasion demands. The seal means 40 has a seal main body 43, and a lip portion 41 supported by a support portion 42 formed in one end portion of the seal main body 43.

The seal means 40 is formed by a rubber body or the like, and the lip portion 41 is brought into contact with an outer peripheral surface of the valve 36 on the basis of an elastic force of the support portion 42. The seal main body 43 is attached to an inner peripheral surface of the second lead air flow path, and an end portion of the seal main body 43 in an opposite side to the side, where the support portion 42 is formed, is brought into contact with a portion near the outer peripheral side end portion of the first lead air flow path 14 formed in the cylinder 2.

In FIG. 2, there is shown a state in which a fluid flow path having the rotary valve disposed in the middle of the fluid flow path is configured by the second lead air flow path 32 and the third lead air flow path 33, a communication between the third lead air flow path 33 and the second lead air flow path 32 is shut off by the valve 36 and the seal means 40, and the rotary valve 35 is closed.

The supply of the lead air purified by the air cleaner 25 to the piston groove 17 and the scavenging flow path 18 is shut off by shutting off the communication between the third lead air flow path 33 and the second lead air flow path 32 by means of the valve 36 and the seal means 40. Accordingly, it is possible to prevent the lead air from being introduced into the cylinder 2, at a time of the starting time or the idling time of the stratified scavenging two-cycle engine 1.

The lip portion 41 of the seal means 40 is securely brought into contact with the outer peripheral surface of the valve 36 on the basis of the elastic force of the support portion 42. Further, when the rotary valve 35 is closed at the starting time or the idling time of the stratified scavenging two-cycle engine 1, the second lead air flow path 32 side comes to a negative pressure due to a suction of the crank chamber 7, and the pressure of the lead air within the third lead air flow path 33 comes to a higher pressure than the pressure of the lead air within the second lead air flow path 32.

Accordingly, the lead air within the third lead air flow path 33 presses a non-contact surface side of the lip portion 41, that is, a back surface side in which the lip portion 41 is not in contact with the outer peripheral surface of the valve 36, through a gap 39 formed between the outer peripheral surface of the valve 36 and an inner diameter portion of the body 37. Further, since the second lead air flow path 32 side comes to the negative pressure, it is possible to suck the surface of the lip portion 41 which is in contact with the outer peripheral surface of the valve 36, thereby strongly pressing the lip portion 41 to the outer peripheral surface of the valve 36.

In this manner, a sealing effect by the seal means 40 is improved, and the shutoff of the lead air can be securely achieved by the rotary valve 35. Furthermore, since the lip portion 41 is elastically supported by the support portion 42 supporting the lip portion 41, it is possible to more effectively achieve the shutoff of the lead air by the rotary valve 35.

In the description mentioned above, the description is given of the case that two operations comprising the pressing operation in the non-contact surface side of the lip portion 41 achieved by the high pressure lead air within the third lead air flow path 33, and the pressing operation to the contact portion of the lip portion 41 achieved by sucking the surface side, which is brought into contact with the outer peripheral surface of the valve 36, in the lip portion 41 due to the negative pressure within the second lead air flow path 32 are simultaneously applied. However, the operation of improving the sealing performance with respect to the lip portion 41 is not applied only to the case that two operations mentioned above are simultaneously applied, but the operation of improving the sealing performance with respect to the lip portion 41 can be achieved even in the case that only one operation is applied to the lip portion 41.

FIG. 3 shows a state in which the valve 36 is rotationally controlled on the basis of an external operation, and the third lead air flow path 33 and the second lead air flow path 32 are communicated by the valve through hole 38 formed in the valve 41, that is, a state in which the rotary valve 35 is opened. When the valve 36 is rotated, the support portion 42 elastically supporting the lip portion 41 executes an elastic deformation, and a rotational resistance of the valve 36 can be reduced.

Further, it is possible to reduce a rotational resistance caused by the contact with the lip portion 41 at a time of the rotation of the rotary valve 36, by employing a configuration having a corner portion in the lip portion 41 so as to allow the contact portion between the lip portion 41 and the outer peripheral surface of the valve 36 to be brought into contact in an approximately line contact state.

(Second Embodiment)

FIG. 4 shows a second embodiment according to the present invention. The second embodiment is provide with the same configuration as that of the first embodiment except the configuration of the seal means. Therefore, a description of the same members will be omitted by using the same reference numerals of the members as those in the first embodiment.

As shown in FIG. 4, the second embodiment shows a modified example of the support portion. An elastic piece 44 is formed in one end portion of the seal main body 43, and achieves an operation of the support portion. Further, the seal main body 43 is slidably inserted to an inner diameter surface of the second lead air flow path 32. When attaching the insulator 30 to the cylinder 2 as shown in FIG. 1, the seal main body 43 slides to a right side in FIG. 4 due to an elastic force of the elastic piece 44, and the lip portion 41 in the other end portion of the seal main body 43 is brought into contact with the outer peripheral surface of the valve 36.

At this time, the elastic piece 44 serving as the support portion is also provided with a function of sealing an outer peripheral portion of the first lead air flow path 14 formed in the cylinder 2, and can securely seal between the second lead air flow path 32 and a flow path passing through a gap formed between the outer peripheral surface of the valve 36 and the inner diameter portion of the body 37 from the third lead air flow path 33.

When the valve 36 is rotated in accordance with an external control, the seal main body 43 slides in a direction of deflecting the elastic piece 44, whereby it is possible to reduce a rotational resistance of the valve 36 by the seal means 40. In this case, in FIG. 4, there is shown an example in which the lip portion directly supported by the support portion as in the first embodiment is not formed in the seal means 40 brought into contact with the outer peripheral surface of the valve 36. However, the lip portion elastically supported by the support portion as shown in the first embodiment may be formed in an end portion brought into contact with the outer peripheral surface of the valve 36 in the seal main body 43.

In the case that the lip portion directly supported by the support portion is formed in the end portion brought into contact with the outer peripheral surface of the valve 36 in the seal main body 43, the rotational resistance of the valve 36 can be reduced due to a synergetic effect obtained by the elastic deformation of the lip portion and the elastic piece 44 at a time when the valve 36 is rotated. Further, in either of the case that the lip portion directly supported by the support portion is formed or the case that it is not formed, the contact between the seal means 40 and the valve 36 according to the second embodiment can be set in a surface contact state, but, it is desirable that they are brought-into contact with each other in an approximately line contact state.

Moreover, in either of the case that the lip portion directly supported by the support portion is formed or the case that it is not formed, in the seal means 40 of the second embodiment, it is possible to achieve the pressing operation applied to the non-contact surface side of the lip portion 41 on the basis of the high pressure lead air within the third lead air flow path 33, and the sucking operation applied to the lip portion 41 on the basis of the suction of the surface brought into contact with the outer peripheral surface of the valve 36 in the lip portion 41 due to the negative pressure within the second lead air flow path 32, in the second embodiment in the same manner as the case of the first embodiment.

In addition, the configuration may be made such that the lip portion has a corner portion so as to allow the contact portion between the lip portion brought into contact with the outer peripheral surface of the valve 36 in the seal main body 43 and the outer peripheral surface of the valve 36 to be in contact with each other in an approximately line contact state. At this time, it is possible to reduce the rotational resistance on the basis of the contact between the lip portion and the valve 36 at a time of the rotation of the rotary valve 35.

(Third Embodiment)

FIG. 5 shows a third embodiment of the present invention. The third embodiment is provide with the same configuration as that of the first embodiment except that the seal means is arranged in the outer peripheral portion of the valve 36. Therefore, a description of the same members will be omitted by using the same reference numerals of the members as those in the first embodiment.

As shown in FIG. 5, in the third embodiment, the seal means 40 is formed in the outer peripheral surface of the valve 36. The seal main body 43 and the lip portion 41 are formed in such a configuration that the third lead air flow path 33 and the gap 39 are sealed therebetween by the seal means 40 at a time when the valve through hole 38 exists at a position shown in FIG. 5 and makes the second lead air flow path 32 and the third lead air flow path 33 in a non-communicated state.

In the seal means 40 according to the third embodiment, it is possible to achieve the pressing operation applied to the non-contact surface side of the lip portion 41 on the basis of the high pressure lead air within the third lead air flow path 33, and the sucking operation applied to the lip portion 41 on the basis of the suction of the surface brought into contact with the inner diameter surface of the body 37 in the lip portion 41 due to the negative pressure within the second lead air flow path 32, in the third embodiment in the same manner as the case of the first embodiment.

The seal main body 43 is rotated in response to the rotation of the valve 36, and the lip portion 41 is rotated along the inner diameter surface of the body 37 while being in contact. Since the lip portion 41 is elastically supported by the support portion 42, it is possible to reduce the rotational resistance from the lip portion 41 at a time when the valve 36 is rotated.

Further, the configuration is made such that the lip portion 41 has a corner portion so as to allow the contact portion between the lip portion 41 and the inner diameter surface of the body 37 to be in contact with each other in an approximately line contact state, thereby making it possible to reduce the rotational resistance on the basis of the contact between the lip portion 41 and the inner diameter surface of the body 37 at a time of the rotation of the rotary valve 35.

(Fourth Embodiment)

FIG. 6 shows a fourth embodiment of the present invention. The fourth embodiment is provide with the same configuration as that of the first embodiment except that the seal means is attached to an inner side of the third lead air flow path 33 and the lip portion 41 is formed inward. Therefore, a description of the same members will be omitted by using the same reference numerals of the members as those in the first embodiment.

As shown in FIG. 6, in the fourth embodiment, the seal means 40 is attached to an inner side of the third lead air flow path 33 corresponding to a connection flow path to the air cleaner 25 shown in FIG. 1, and the lip portion 41 is formed inward in a reverse manner to the case of the first to third embodiments. Accordingly, it is possible to press the non-contact surface side of the lip portion 41 by the lead air having the higher pressure than that of the lead air within the second lead air flow path 32 from the third lead air flow path 33, so that the sealing performance between the lip portion 41 and the outer peripheral surface of the valve 36 can be improved.

Further, since the inner side of the second lead air flow path 32 comes to the negative pressure at the starting time and the idling time of the stratified scavenging two-cycle engine 1, the surface brought into contact with the outer peripheral surface of the valve 36 in the lip portion 41 is sucked. Therefore, it is possible to increase the pressing force applied to the outer surface of the valve 36 in the lip portion 41, and the sealing performance of the seal means 40 can be improved.

At a time of the rotation of the valve 36, it is possible to reduce the rotational resistance of the valve 36 generated by the contact with the lip portion 41 on the basis of the elastic force of the support portion 42. Further, the configuration is made such that the lip portion 41 has a corner portion so as to allow the contact portion between the lip portion 41 and the outer peripheral surface of the valve 36 to be in contact with each other in an approximately line contact state, thereby making it possible to reduce the rotational resistance on the basis of the contact between the lip portion 41 and the outer peripheral surface of the valve 36 at a time of the rotation of the rotary valve 35.

In the fourth embodiment, the elastic piece may be formed in the side of the air cleaner 25 of the seal main body 43 as in the second embodiment. Furthermore, the configuration may be made such that the configuration of the seal means according to the fourth embodiment is added to the configuration of the seal means according to the first to third embodiments.

Although the present invention relates to the rotary valve which can be disposed within the fluid flow path, the technical idea of the present invention can be applied to the apparatus which can employ the rotary valve.

What is claimed is:

1. A rotary valve disposed between fluid flaw paths and having a valve and a body, comprising:
   a gap formed between an inner diameter portion of the body and an outer peripheral surface of the valve; and
   seal means for sealing the gap between a fluid flow path at a valve downstream side of the fluid flow paths and the body,
   wherein the seal means has a lip portion brought into contact with the outer peripheral surface of the valve at a corner of the lip portion and is disposed inside the fluid flow pat at the valve downstream side integrally with the fluid flow path.

2. The rotary valve according to claim 1, wherein a support portion of the lip portion in the seal means elastically supports the lip portion.

3. The rotary valve according to claim 1 or 2, wherein a side of a surface of the lip portion, the surface not established contact with the outer peripheral surface of the valve, is directed to a high pressure fluid side of the fluid flow path.

4. The rotary valve according to claim 1 or 2, wherein the rotary valve is formed as a lead air control valve of a stratified scavenging two-cycle engine.

5. The rotary valve according to claim 4, wherein the rotary valve is provided in an insulator connected to an intake port of the stratified scavenging two-cycle engine.

6. The rotary valve according to claim 3, wherein the rotary valve is formed as a lead air control valve of a stratified scavenging two-cycle engine.

7. The rotary valve according to claim 6, wherein the rotary valve is provided in an insulator connected to an intake port of the stratified scavenging two-cycle engine.

8. A rotary valve disposed between fluid flow paths and having a valve and a body, the valve having a spherical shape and the body receiving the valve, the rotary valve comprising:
   a gap formed between an inner diameter portion of the body and an outer peripheral surface of the valve; and
   seal means for sealing the gap, wherein the seal means has a lip portion brought into contact with the inner diameter portion of the body and is disposed on the valve.

9. The rotary valve according to claim 8, wherein a support portion of the lip portion in the seal means elastically supports the lip portion.

10. The rotary valve according to claim 8 or 9, wherein a side of a surface of the lip portion, the surface not establishing contact with the inner diameter portion of the body, is directed to a high pressure fluid side of the fluid flow path.

11. The rotary valve according to claim 8 or 9, wherein the rotary valve is formed as a lead air control valve of a stratified scavenging two-cycle engine.

12. The rotary valve according to claim 11, wherein the rotary valve is provided in an insulator connected to an intake port of the stratified scavenging two-cycle engine.

13. The rotary valve according to claim 10, wherein the rotary valve is formed as a lead air control valve of a stratified scavenging two-cycle engine.

14. The rotary valve according to claim 13, wherein the rotary valve is provided in an insulator connected to an intake port of the stratified scavenging two-cycle engine.

* * * * *